（12） United States Patent
Nasir et al.

(10) Patent No.: US 10,544,693 B2
(45) Date of Patent: Jan. 28, 2020

(54) SERVICE ROUTING CONFIGURATION FOR A GAS TURBINE ENGINE DIFFUSER SYSTEM

(71) Applicant: HONEYWELL INTERNATIONAL INC., Morris Plains, NJ (US)

(72) Inventors: Shakeel Nasir, Torrance, CA (US); John Schugardt, Chandler, AZ (US); Justin Brown, Phoenix, AZ (US); Cristopher Frost, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 425 days.

(21) Appl. No.: 15/183,274

(22) Filed: Jun. 15, 2016

(65) Prior Publication Data

US 2017/0362947 A1    Dec. 21, 2017

(51) Int. Cl.
*F01D 9/06* (2006.01)
*F04D 29/44* (2006.01)
(Continued)

(52) U.S. Cl.
CPC ............ *F01D 9/065* (2013.01); *F01D 9/041* (2013.01); *F02C 3/04* (2013.01); *F04D 17/025* (2013.01);
(Continued)

(58) Field of Classification Search
CPC .. F01D 9/065; F01D 9/041; F02C 3/04; F02C 3/08; F02C 6/08; F04D 17/025; F04D 29/284; F04D 29/444; F04D 29/54; F04D 29/542; F04D 29/42; F04D 29/44; F04D 29/441; F05D 2250/52; F05D 2240/129; F23R 3/04
See application file for complete search history.

(56) References Cited

U.S. PATENT DOCUMENTS 2,489,692 A    11/1949  Whittle
3,832,089 A     8/1974  Moellmann
(Continued)

FOREIGN PATENT DOCUMENTS

EP    2123863 A1    5/2009
GB    2054748 B     3/1983
(Continued)

OTHER PUBLICATIONS

Extended EP Search Report for Application No. 17166130.9-1607 dated Oct. 24, 2017.
(Continued)

*Primary Examiner* — Gerald L Sung
*Assistant Examiner* — Alain Chau
(74) *Attorney, Agent, or Firm* — Lorenz & Kopf, LLP

(57) ABSTRACT

Provided is a radial diffuser that includes a housing, a plurality of diffuser vanes, and a plurality of deswirl vanes and at least one vane extension providing a service routing. Each of the vane extensions is disposed after a radial section and may extend into or through a transition and into the deswirl cascade. At least a portion of the vane extensions include a service passage extending therethrough. Each service passage is configured to allow a service conduit to extend therethrough without adversely crossing either a diffusion flow passage or a transition flow passage.

14 Claims, 6 Drawing Sheets

(51) Int. Cl.
    *F02C 3/04*     (2006.01)
    *F04D 17/02*     (2006.01)
    *F04D 29/28*     (2006.01)
    *F04D 29/32*     (2006.01)
    *F04D 29/42*     (2006.01)
    *F04D 29/52*     (2006.01)
    *F04D 29/54*     (2006.01)
    *F01D 9/04*     (2006.01)

(52) U.S. Cl.
    CPC ......... *F04D 29/284* (2013.01); *F04D 29/321* (2013.01); *F04D 29/4206* (2013.01); *F04D 29/441* (2013.01); *F04D 29/444* (2013.01); *F04D 29/522* (2013.01); *F04D 29/542* (2013.01); *F05D 2220/32* (2013.01); *F05D 2240/129* (2013.01); *F05D 2240/35* (2013.01)

(56) References Cited

U.S. PATENT DOCUMENTS

| | | | | |
|---|---|---|---|---|
| 3,861,826 A * | 1/1975 | Dean, Jr. | ............... | F04D 29/444 415/208.4 |
| 3,873,232 A * | 3/1975 | Stein | ..................... | F04D 29/441 415/207 |
| 4,027,997 A * | 6/1977 | Bryans | .................... | F04D 21/00 415/207 |
| 4,100,732 A * | 7/1978 | Bryans | ..................... | F02C 3/08 60/804 |
| 4,251,183 A * | 2/1981 | Liu | ........................ | F04D 17/122 138/39 |
| 4,264,272 A | 4/1981 | Weiler | | |
| 4,344,737 A * | 8/1982 | Liu | ........................ | F04D 29/441 415/199.1 |
| 5,496,150 A | 3/1996 | Claxton, III et al. | | |
| 6,279,322 B1 * | 8/2001 | Moussa | ................. | F04D 29/444 60/751 |
| 6,280,139 B1 | 8/2001 | Romani et al. | | |
| 6,540,481 B2 * | 4/2003 | Moussa | ................... | F01D 5/145 415/208.2 |
| 6,589,015 B1 * | 7/2003 | Roberts | ................... | F01D 9/045 415/208.3 |
| 7,025,566 B2 * | 4/2006 | Sasu | ....................... | F01D 9/045 415/208.3 |
| 7,442,006 B2 * | 10/2008 | Nguyen | .............. | F04D 29/4206 29/889.22 |
| 7,500,364 B2 | 3/2009 | Schumacher et al. | | |
| 7,506,511 B2 | 3/2009 | Zupanc et al. | | |
| 7,717,672 B2 | 5/2010 | Barton et al. | | |
| 8,100,643 B2 * | 1/2012 | Leblanc | ................ | F04D 29/681 415/208.2 |
| 8,425,188 B2 | 4/2013 | Dovbush et al. | | |
| 9,631,814 B1 * | 4/2017 | Barton | .................... | F01D 5/142 |
| 2008/0056892 A1 | 3/2008 | Barton et al. | | |
| 2009/0304502 A1 * | 12/2009 | Nolcheff | ................. | F01D 9/041 415/208.2 |
| 2012/0272663 A1 * | 11/2012 | Moussa | ................... | F01D 5/146 60/805 |
| 2014/0255181 A1 | 9/2014 | Ress, Jr. et al. | | |

FOREIGN PATENT DOCUMENTS

WO         01/18404 A1     3/2001
WO    2014/137430 A1     9/2014

OTHER PUBLICATIONS

EP Examination Report for Application No. 17166130.9 dated Nov. 27, 2018.

* cited by examiner

SERVICE ROUTING CONFIGURATION FOR A GAS TURBINE ENGINE DIFFUSER SYSTEM

STATEMENT REGARDING FEDERALLY SPONSORED RESEARCH OR DEVELOPMENT

This invention was made with Government support under Contract No. W911W6-08-2-0001 awarded by the Department of Defense. The Government has certain rights in this invention.

TECHNICAL FIELD

The present invention relates to gas turbine engine diffusers, and more particularly, to a gas turbine engine diffuser with service routing configurations.

BACKGROUND

Aircraft main engines not only provide propulsion for the aircraft, but in many instances may also be used to drive various other rotating components such as, for example, generators, compressors, and pumps, to thereby supply electrical, pneumatic, and/or hydraulic power. Generally, a gas turbine engine includes a combustor, a power turbine, and a compressor. During operation of the engine, the compressor draws in ambient air, compresses it, and supplies compressed air to the combustor. The compressor also typically includes a diffuser that diffuses the compressed air before it is supplied to the combustor. The combustor receives fuel from a fuel source and the compressed air from the compressor, and supplies high energy combustion gases to the power turbine, causing it to rotate. The power turbine includes a shaft that may be used to drive the compressor.

In some instances, an engine may additionally include a starter-generator, which may either drive the turbine or be driven by the turbine, via the turbine output shaft. Some engines additionally include a bleed air port between the compressor section and the turbine section. The bleed air port allows some of the compressed air from the compressor section to be diverted away from the turbine section, and used for other functions such as, for example, main engine starting air, environmental control, and/or cabin pressure control.

Gas turbine engines are constructed using one of several different bearing architectures. In one type of engine architecture, namely the popular "mid-sump" architecture, a bearing cavity, often referred to as a "sump", is housed in proximity to the combustor near the middle of the engine. The bearing cavity, or sump, relies on service routings to supply various services such as air and oil thereto.

Although most engines, such as those generally described above, are robust, safe, and reliable, some engines do suffer certain drawbacks. For example, in certain mid-sump engines having compressors with radial vane diffusers, it may be difficult to supply air or oil service, electrical service for sensors, or other types of service to a bearing cavity or other region within the engine without crossing the air flow path within the diffuser. It is may also be difficult to structurally tie the bearing cavity to other structures of the engine.

Accordingly, there is a need for an improved system for providing oil and air service, and/or other types of service, to an engine with a radial vane diffuser without crossing the air flow path within the diffuser. The present invention addresses one or more of these needs.

SUMMARY

The present disclosure describes a system for providing oil and air service to an engine with a diffuser including a radial section and a deswirl cascade without adversely effecting or Interfering with the air flow path within the diffuser.

In one embodiment, and by way of example only, a radial diffuser includes a housing, a plurality of diffuser vanes, and a plurality of deswirl vanes and at least one vane extension providing a service routing. The housing includes an air inlet and an air outlet, and defines a radial section, an axial section, and a transition between the air inlet and air outlet. The radial section extends at least substantially radially outward from the air inlet to the transition. The axial section extends at least substantially axially from the transition to the air outlet. The transition includes a bend, and extends between the radial section and the axial section. The diffuser vanes are coupled to the housing, and is disposed in the radial section. The plurality of diffuser vanes defines a plurality of diffusion flow passages through the radial section. The plurality of deswirl vanes is configured into a deswirl cascade coupled to the housing after the bend in the transition. Each of the vane extensions is disposed after the radial section and may extend into or through the bend and into the deswirl cascade. At least a portion of the vane extensions includes a service passage extending therethrough. Each service passage is configured to allow a service conduit to extend therethrough without adversely crossing either a diffusion flow passage or a transition flow passage.

In another embodiment, and by way of example only, a system includes a compressor having a compressor housing, an impeller, and a radial diffuser for directing a flow of compressed air with a radial component to a diffused annular flow having an axial component. The impeller is rotationally mounted within the compressor housing, and has a leading edge and a trailing edge. The impeller is operable, upon rotation thereof, to discharge a flow of air having a velocity magnitude and a pressure magnitude from the trailing edge. The radial diffuser includes a diffuser housing, a plurality of diffuser vanes, and a plurality of deswirl. The diffuser housing includes an air inlet and an air outlet, and defines a radial section, an axial section, and a transition between the air inlet and air outlet. The air inlet is in fluid communication with the impeller trailing edge to thereby receive the flow of air discharged therefrom. The radial section extends at least substantially outward from the air inlet to the transition. The axial section extends at least substantially axially from the transition to the air outlet. The transition includes a bend region, and extends between the radial section and the axial section. The plurality of diffuser vanes defines a plurality of diffusion flow passages through the radial section. The plurality of deswirl vanes is configured into a deswirl cascade coupled to the housing after the bend. Each of the vane extensions is disposed after the radial section and may extend into or through the bend and into the deswirl cascade. At least a portion of the vane extensions includes a service passage extending therethrough. Each service passage is configured to allow a service conduit to extend therethrough without adversely crossing either a diffusion flow passage or a transition flow passage. In combination, the vane extensions may act as a spoke-like structures mechanically coupling the compressor housing, a mid-sump housing and the diffuser housing advantageously providing an improved bearing load path through from the mid-sump forward to the compressor.

In yet another embodiment, and by way of example only, a system includes a gas turbine engine having an engine housing, a compressor, a combustor, and a turbine all mounted in flow series within the housing. The compressor includes at least a compressor housing, an impeller, and a radial diffuser for directing a flow of compressed air with a radial component to a diffused annular flow having an axial component. The impeller is rotationally mounted within the compressor housing, and has a leading edge and a trailing edge. The impeller is operable, upon rotation thereof, to discharge a flow of air having a velocity magnitude and a pressure magnitude from the trailing edge. The radial diffuser includes a diffuser housing, a plurality of diffuser vanes, and a plurality of integral service vanes. The diffuser housing includes an air inlet and an air outlet, and defines a radial section, an axial section, and a transition between the air inlet and air outlet. The air inlet is in fluid communication with the impeller trailing edge to thereby receive the flow of air discharged therefrom. The radial section extends at least substantially outward from the air inlet to the transition. The axial section extends at least substantially axially from the transition to the air outlet. The transition includes a bend, and extends between the radial section and the axial section. The plurality of diffuser vanes defines a plurality of diffusion flow passages through the radial section. The plurality of deswirl vanes is configured into a deswirl cascade coupled to the housing after the bend. Each of the vane extensions is disposed after the radial section and may extending into or through the bend and into the deswirl cascade. At least a portion of the vane extensions includes a service passage extending therethrough. Each service passage is configured to allow a service conduit to extend therethrough without crossing either a diffusion flow passage or a transition flow passage. In combination, the vane extensions may act as a spoke-like structures mechanically coupling a compressor housing, a mid-sump housing and the diffuser housing advantageously providing an improved bearing load path through from the mid-sump forward to the compressor.

In still another embodiment, vane extensions provide structural support for a mid-sump bearing while optionally additionally providing a route for sump services. The vane extensions may serve as spokes to tie outer and inner sides of a deswirl cascade in a bend region between the mid-sump housing and a compressor housing. In such an arrangement, an inner side of the deswirl cascade connects to the mid-sump housing. An outer side of the deswirl cascade connects to the compressor housing. A bearing load path is effectively formed from the bearing housing aft side to the compressor housing foreword side via the vane extensions.

Other independent features and advantages of the preferred systems will become apparent from the following detailed description, taken in conjunction with the accompanying drawings which illustrate, by way of example, the principles of the invention.

DETAILED DESCRIPTION

Before proceeding with a detailed description, it is to be appreciated that the described embodiment is not limited to use in conjunction with a particular type of turbine engine or particular type of compressor. Thus, although the present embodiment is, for convenience of explanation, depicted and described as being implemented in an engine having a single stage axial compressor with a single stage centrifugal compressor and other specific characteristics, it will be appreciated that it can be implemented as various other types of compressors, engines, turbochargers, and various other fluid devices, and in various other systems and environments.

Figure 1:
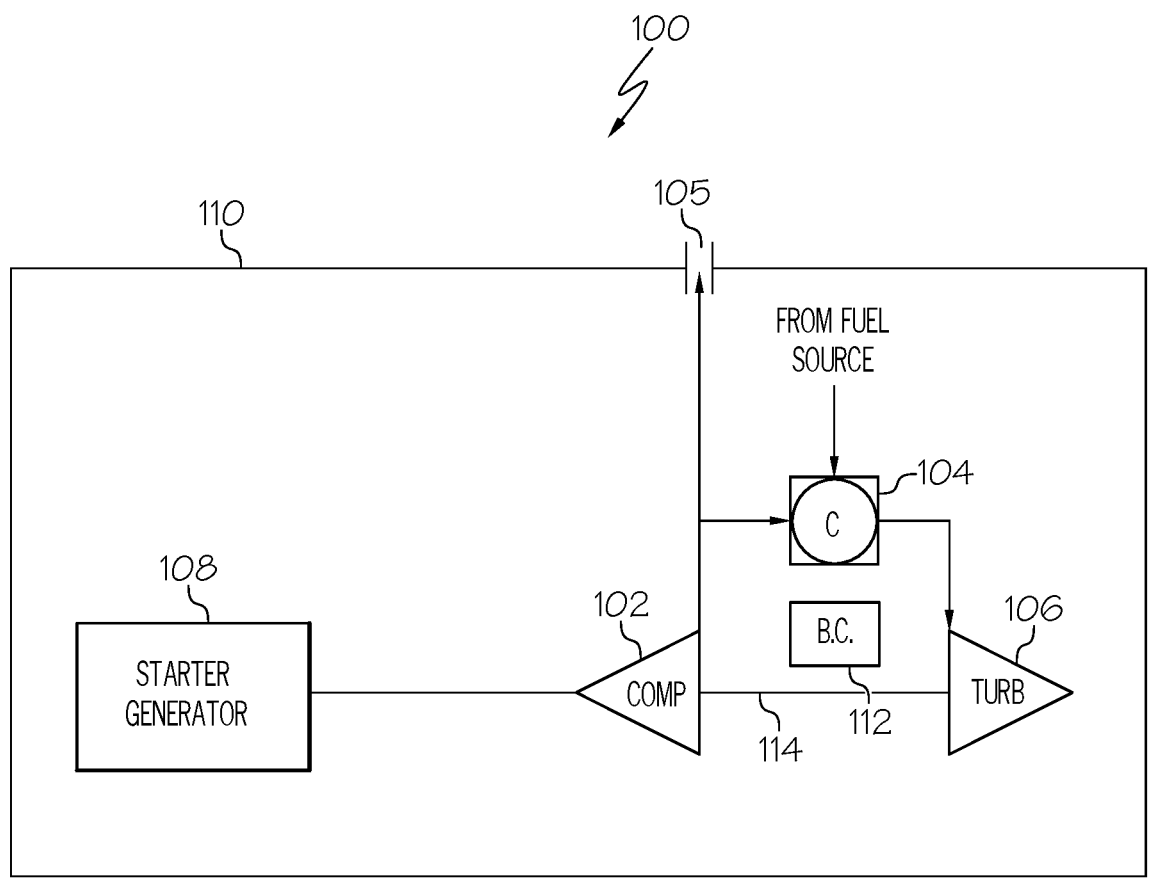
FIG. 1 is a schematic representation of a gas turbine engine according to an exemplary embodiment of the present invention.

Turning now to the description, and with reference first to FIG. 1, an embodiment of an exemplary gas turbine engine 100 is shown in simplified schematic form. The engine 100 may be an auxiliary power unit (APU) for an aircraft, or any of a number of other different types of gas turbine engines. The engine 100 includes a compressor 102, a combustor 104, a turbine 106, and a starter-generator unit 108, all preferably housed within a single containment housing 110. As shown in FIG. 1, certain engines 100 may also have a bearing case 112 housed in proximity to the combustor 104, or otherwise in the interior of the engine 100, that requires routings for service such as air and oil for proper functioning.

During operation of the engine 100, the compressor 102 draws ambient air into the containment housing 110. The compressor 102 compresses the ambient air, and supplies a portion of the compressed air to the combustor 104, and may also supply compressed air to a bleed air port 105. The bleed air port 105, if included, is used to supply compressed air to a non-illustrated environmental control system. It will be appreciated that the compressor 102 may be any one of numerous types of compressors now known or developed in the future.

The combustor 104 receives the compressed air from the compressor 102, and also receives a flow of fuel from a non-illustrated fuel source. The fuel and compressed air are mixed within the combustor 104, and are ignited to produce relatively high-energy combustion gas. The combustor 104 may be implemented as any one of numerous types of combustors now known or developed in the future. Non-limiting examples of presently known combustors include various can-type combustors, various reverse-flow combustors, various through-flow combustors, and various slinger combustors.

No matter the particular combustor 104 configuration used, the relatively high-energy combustion gas that is generated in the combustor 104 is supplied to the turbine 106. As the high-energy combustion gas expands through the turbine 106, it impinges on the turbine blades (not shown in FIG. 1), which causes the turbine 106 to rotate. The turbine 106 includes an output shaft 114 that drives the compressor 102.

Figure 2:
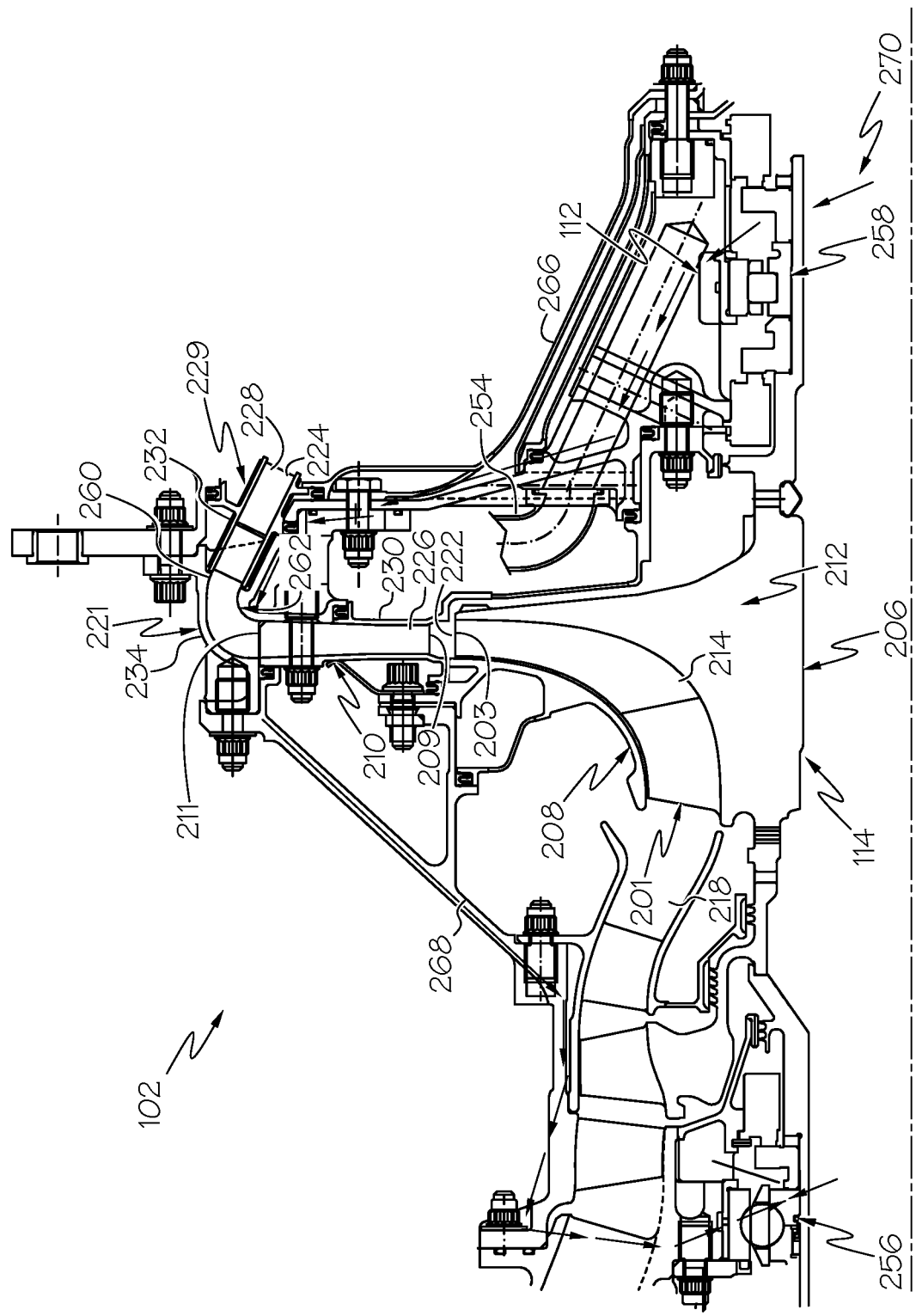
FIG. 2 is a partial cross-section view of an axial-centrifugal compressor stage of gas turbine engine according to an exemplary embodiment.

Turning now to FIG. 2, a more detailed description of the compressor 102 will be provided. In the depicted embodiment, the compressor 102 has a single axial compressor stage compressor upstream of a single centrifugal stage compressor and includes an impeller 206, a shroud 208, and a diffuser assembly 210. The impeller 206 is mounted on the output shaft 114, via a hub 212, and is thus rotationally driven by either the turbine 106 or the starter-generator 108, as described above. A plurality of spaced-apart blades 214 extend generally radially from the hub 212 and together therewith define a leading edge 201 and a trailing edge 203. As is generally known, when the impeller 206 is rotated, the blades 214 draw air into the impeller 206, via the leading edge 201, and increase the velocity of the air to a relatively high velocity. The relatively high velocity air is then discharged from the impeller 206, via the trailing edge 203.

The shroud 208 is disposed adjacent to, and partially surrounds, the impeller blades 214. The shroud 208, among other things, cooperates with an annular inlet duct 218 to direct the air drawn into the engine 100 by the compressor 102 into the impeller 206.

The diffuser assembly 210 is a radial vane diffuser that is disposed adjacent to, and surrounds a portion of, the impeller 206. The diffuser assembly 210 is configured to direct a flow of compressed air with a radial component to a diffused annular flow having an axial component. The diffuser assembly 210 additionally reduces the velocity of the air and increases the pressure of the air to a higher magnitude. The diffuser assembly 210 includes a housing 221, a plurality of diffuser vanes 226.

The diffuser housing 221 includes an air inlet 222 and an air outlet 224. The diffuser housing 221 also defines a radial section 230, an axial section 232, and a bend region 234 between the air inlet 222 and outlet 224. The radial section 230 extends at least substantially radially outward from the air inlet 222 to the bend region 234. The axial section 232 extends at least substantially axially from the bend region 234 to the air outlet 224. The bend region 234 includes a bend region 234, and extends between the radial section 230 and the axial section 232. Preferably, the bend region 234 provides a continuous turn between the radial section 230 and the axial section 232.

The plurality of diffuser vanes 226 is coupled to the diffuser housing 221, and are disposed in the radial section 230. The plurality of diffuser vanes 226 define a plurality of diffusion flow passages 238 (best seen in FIG. 3) through the radial section 230. The diffuser vanes 226 are preferably arranged substantially tangential to the impeller trailing edge 203 and, similar to the impeller blades 214, define a leading edge 209 and a trailing edge 211.

The plurality of deswirl vanes 228 are formed into a deswirl cascade 229 disposed within the diffuser housing 221 after the bend region 234. The deswirl vanes 228 define a plurality of transition flow passages 240 (best seen in FIG. 3) after the bend region 234 in fluid communication with at least one diffusion flow passage 238. The deswirl cascade 229 may include a plurality of rows of deswirl vanes 228, and two rows 242 and 244 of deswirl vanes 228 are depicted in the illustrated embodiment. Each row 242, 244 of vanes may be different in aerodynamic shape, spacing and number as compared to other rows. In addition, within each row 242, 244 of deswirl vanes 228, the individual vanes 228 may have differing aerodynamic shape (lean, sweep, and twist) and spacing in deswirl cascade 229 from neighboring vanes in each row 242, 244 to properly guide and deswirl the flow downstream of the bend region 234.

Figure 3:
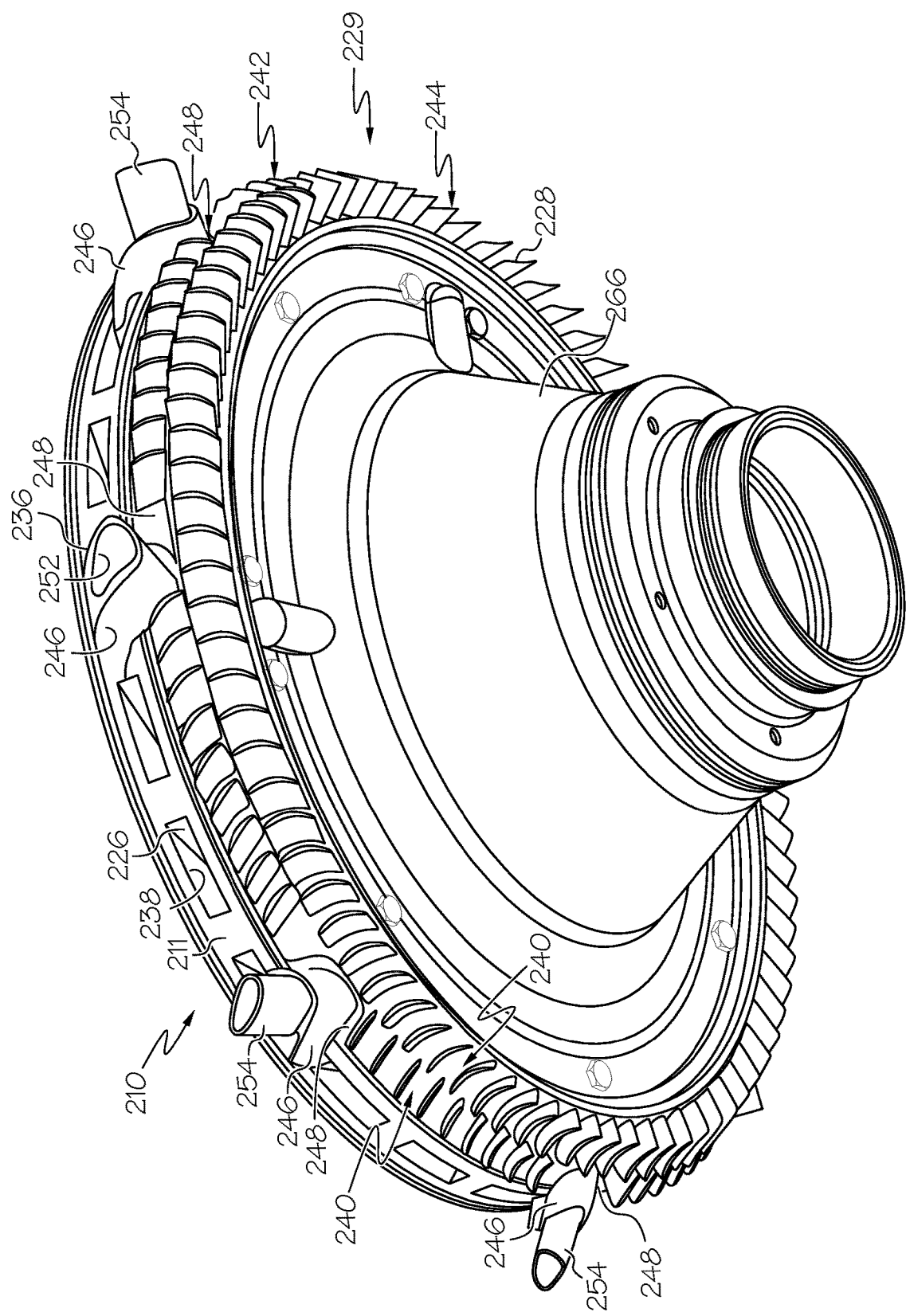
FIG. 3 is a partial perspective view of a diffuser assembly of a centrifugal compressor stage of the gas turbine engine depicted in FIG. 2 and according to an exemplary embodiment.
Figure 4:
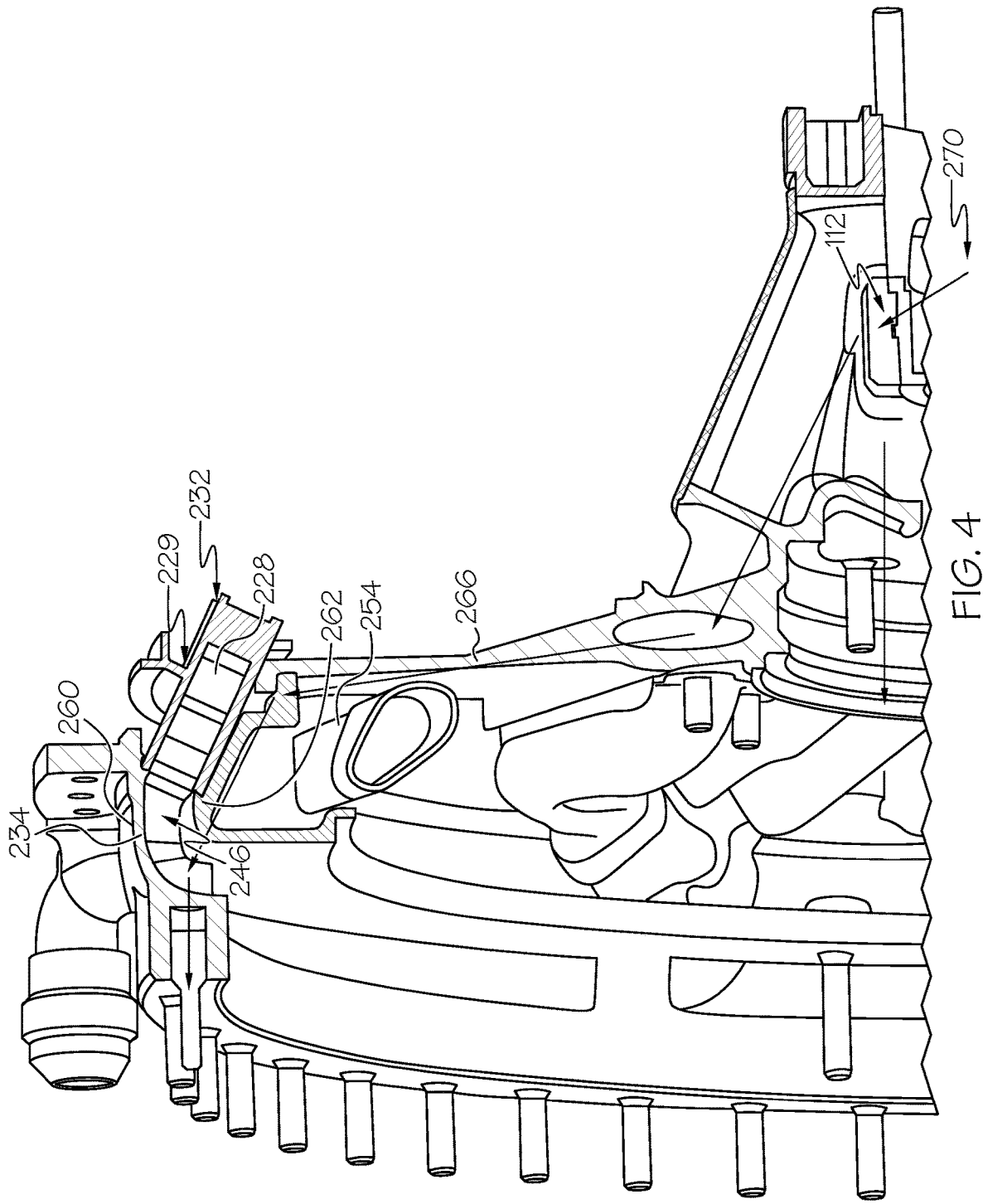
FIG. 4 is a further partial perspective cross section of a diffuser assembly of a centrifugal compressor stage of the gas turbine engine depicted in FIG. 2 and according to an exemplary embodiment.
Figure 5:
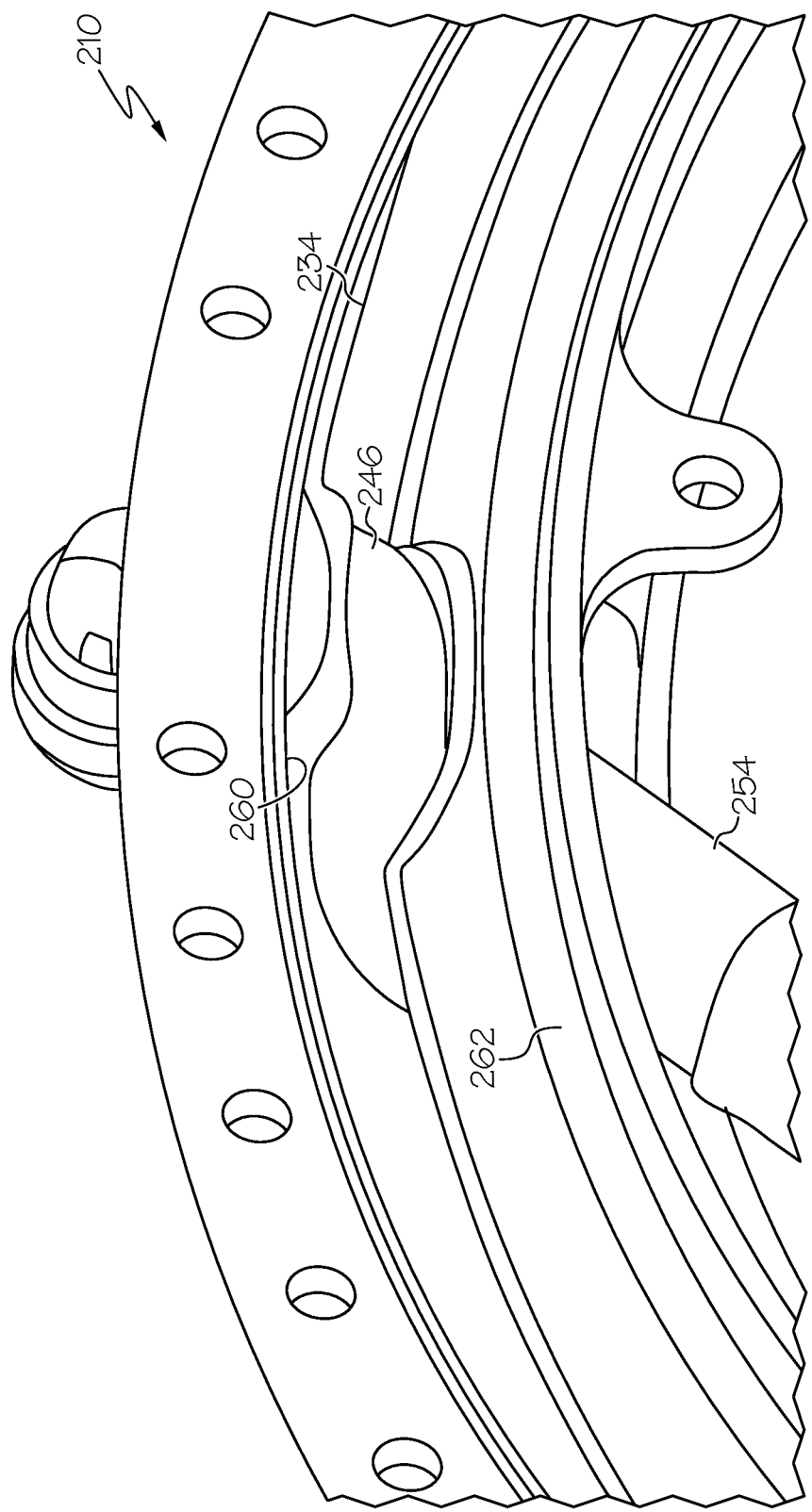
FIG. 5 is partial cross section view of the vane extensions in a diffuser assembly of a centrifugal compressor stage of the gas turbine engine depicted in FIG. 2 and according to an exemplary embodiment.
Figure 6:
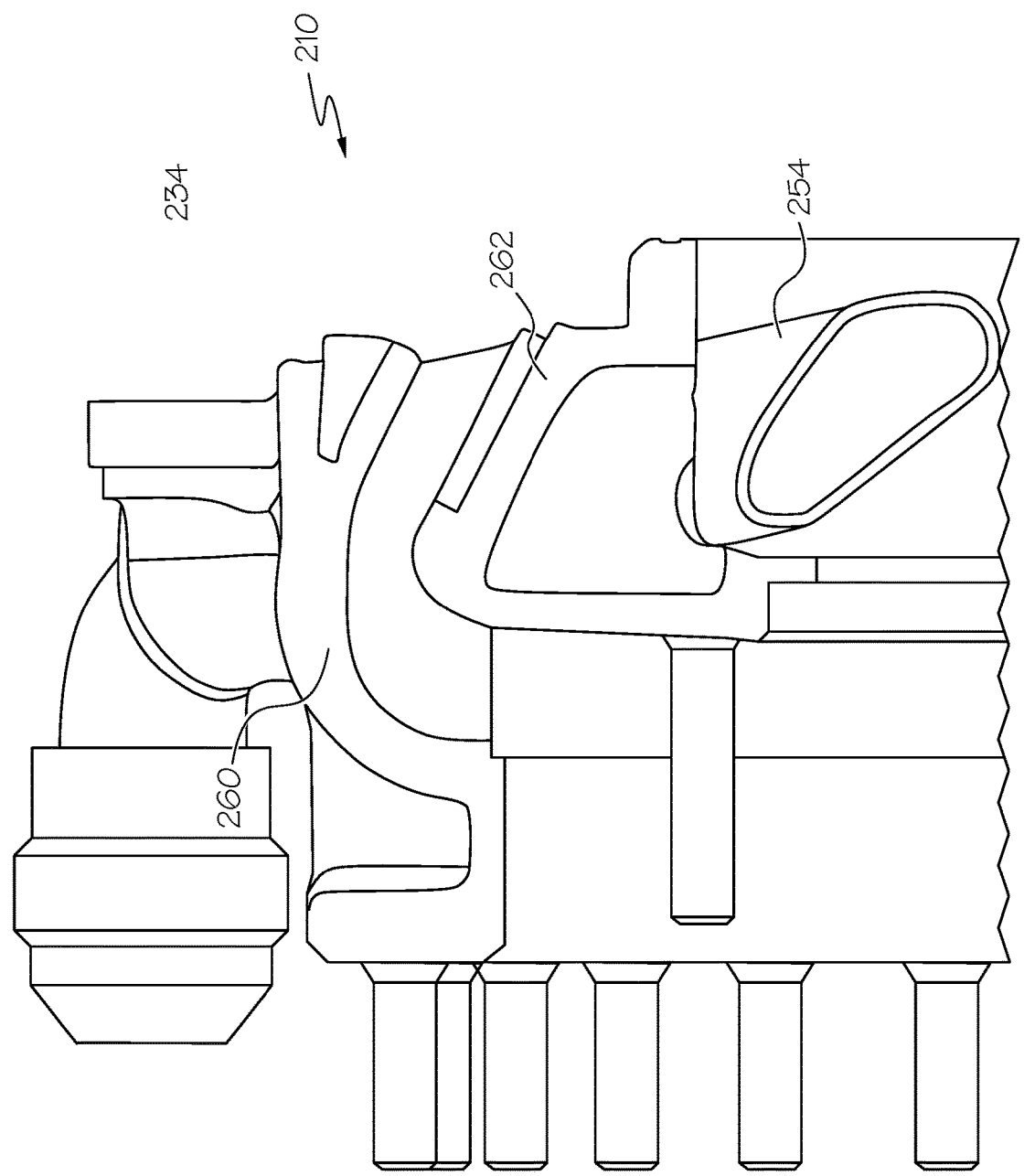
FIG. 6 provides another partial cross section view of the vane extensions with a service conduit in a diffuser assembly of a centrifugal compressor stage of the gas turbine engine depicted in FIG. 2 and according to an exemplary embodiment.

With continued reference to FIG. 3 and further reference to FIGS. 4-6, the diffuser assembly 210 furthermore includes a plurality of diffuser vane extensions 246 disposed downstream of the radial diffuser vanes 226 and extend into the bend region 234. The number of vane extensions 246 may not be, and in exemplary embodiments is not equal to the number of diffuser vanes 226. In such implementations the deswirl cascade 229 and vane extensions 246 are functionally integrated and configured to cooperate to provide the required deswirl and downstream flow. As best seen in in FIGS. 3 and 4, the vane extensions 246 are disposed within the deswirl cascade 229 and within a row 242 of deswirl vanes 228, selected vanes thereof being removed to create spaces 248 for the vane extensions 246. In this regard, the deswirl cascade 229 and vane extensions 246 form a hybrid deswirl structure 250 including vane extensions 246 and deswirl vanes 228 to meet aerodynamic and system performance requirements.

As depicted in FIGS. 3-6, and noted above, the vane extensions 246 in exemplary embodiments, are designed to be used in conjunction with the deswirl cascade 229. The vane extensions 246 may have a suction surface 236 contour that brings air around the bend region 234 without separation, and furthermore, may provide an average Mach number at a deswirl cascade 229 exit that is the same or substantially similar to the case of non-vane extension implementations. Likewise, the vane extensions 246 should provide centrifugal stage performance consistent with baseline bend-deswirl performance.

In exemplary embodiments, the vane extensions 246 are configured to route sump services. In this configuration, and with continued particular reference to FIGS. 3-6, at least some of the vane extensions 246 include a service passage 252 to allow services conduits, an example of which is illustrated as service conduit 254, through the diffuser assembly 210 without crossing either the diffuser flow passage 238 or the bend region 234 flow passage. The service conduits 254 extend through one or more service passages 252 in one or more of the integral vane extensions 246, and provide oil, air and/or other services from one or more non-illustrated service sources to the bearing cavity 112. The service conduits 254 are made of metal tubing in a preferred embodiment; however, it will be appreciated that the service conduits 254 may be made of any of a number of different types of material. It will further be appreciated that the one or more service sources may originate outside of the engine 100, or, for certain types of services (e.g. air), may also originate inside the engine 100. It will also be appreciated that other types of service may also be provided through the service passages 252 and/or service conduits 254, from any of a number of different service sources, to any one of a number of different destinations.

The vane extensions 246 further provide structural support to the engine 100, and particularly between a forward shaft bearing 256 and aft shaft bearing 258 supporting shaft 114 through the engine 100. In exemplary embodiments, the vane extensions 246 serve as spokes tying the outer side 260 and the inner side 262 of the diffuser assembly 210 in the bend region 234 with the effect of providing a continuous structural linkage aft to fore, e.g., an aft to fore load path 270

(fully illustrated in FIG. 2 and partially illustrated in FIG. 4). The inner side 262 connects to a housing 266 of the bearing cavity 112. The outer side 260 connects to a compressor housing 268. Each vane extension 246 provides enhanced structural support by providing multiple load paths 270. At least two load path 270 portions are depicted in FIG. 4.

The vane extensions 246 are materially joined to the outer side 260 and the inner side 262. The vane extensions 246 may be formed by metal casting as part of either the outer side 260 or the inner side 262 and brazed, welded, soldered, bonded or otherwise joined to the corresponding side. Certain vane extensions 246 may include services passages 252; however, the vane extensions do not need to be so formed.

Although the diffuser assembly 210 is depicted and described herein as being implemented in an engine 100 with a compressor 102 having a single stage axial compressor coupled with a single stage centrifugal compressor and various other specific characteristics, it will be appreciated that the diffuser assembly 210 can also be implemented in various other types of compressors, and in various types of engines, turbochargers, and various other fluid devices, and in various other systems and environments. However, regardless of the particular implementations, the diffuser assembly 210, engine 100, and compressor 102 described above in their various embodiments allow for improved oil and air service to a bearing cavity 112 and/or other inner regions of the engine 102, while maintaining superior performance characteristics of a radial vane diffuser.

While the invention has been described with reference to exemplary embodiments, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A radial diffuser for directing a flow of compressed air with a radial component to a diffused annular flow having an axial component, the radial diffuser comprising:
   a housing including an air inlet and an air outlet, and defining a radial section extending at least substantially radially outward from the air inlet to a transition between the air inlet and air outlet, an axial section extending at least substantially axially from the transition to the air outlet, the transition including a bend extending between the radial section and the axial section; and
   a plurality of diffuser vanes coupled to the housing and extending through the radial section, the plurality of diffuser vanes defining a plurality of diffusion flow passages through the radial section, a deswirl cascade having a plurality of deswirl vanes and coupled to the housing after the bend in the transition, wherein the plurality of deswirl vanes are arranged in a first row of deswirl vanes and a second row of deswirl vanes and a plurality of spaces devoid of deswirl vanes is formed in the first row of deswirl vanes, and a plurality of vane extensions are disposed after the radial section, extending through the bend with each one of the plurality of vane extensions extending into one of the plurality spaces, wherein at least a portion of the vane extensions include a service passage extending therethrough, each service passage being configured to allow a service conduit to extend therethrough.

2. The radial diffuser of claim 1, wherein each of the plurality of vane extensions is further configured to deswirl the diffused air.

3. The radial diffuser of claim 1, further comprising: at least one service conduit extending through the service passage.

4. The radial diffuser of claim 1, wherein each of the plurality of vane extensions provides a structural tie with at least one external structure.

5. A gas turbine engine, comprising: an engine housing; a compressor, a combustor, and a turbine all mounted in flow series within the housing, the compressor including at least: a compressor housing; an impeller rotationally mounted within the compressor housing and having a leading edge and a trailing edge, the impeller operable, upon rotation thereof, to discharge a flow of air having a velocity magnitude and a pressure magnitude from the trailing edge; and a radial diffuser for directing a flow of compressed air with a radial component to a diffused annular flow having an axial component, the radial diffuser comprising:
   a housing including an air inlet and an air outlet, and defining a radial section extending at least substantially radially outward from the air inlet to a transition between the air inlet and air outlet, an axial section extending at least substantially axially from the transition to the air outlet, the transition including a bend and extending between the radial section and the axial section; and
   a plurality of diffuser vanes coupled to the housing and extending through the radial section, the plurality of diffuser vanes defining a plurality of diffusion flow passages through the radial section, a deswirl cascade having a plurality of deswirl vanes and coupled to the housing after the bend in the transition, wherein the plurality of deswirl vanes are arranged in a first row of deswirl vanes and a second row of deswirl vanes and a plurality of spaces devoid of deswirl vanes is formed in the first row of deswirl vanes, and a plurality of vane extensions are disposed after the radial section, extending through the bend with each one of the plurality of vane extensions extending into one of the plurality spaces, wherein at least a portion of the vane extensions include a service passage extending therethrough, each service passage being configured to allow a service conduit to extend therethrough.

6. The gas turbine engine of claim 5, wherein each of the plurality of vane extensions is further configured to deswirl the diffused air.

7. The gas turbine engine of claim 5, further comprising at least one service conduit extending through the service passage.

8. The gas turbine engine of claim 5, wherein each of the plurality of vane extensions provide a structural tie with at least one external structure.

9. The gas turbine engine of claim 8, wherein the structural tie defines at least one load path from a mid-sump housing to the compressor housing.

10. A compressor system comprising a compressor housing; an impeller rotationally mounted within the compressor housing and having a leading edge and a trailing edge, the impeller operable, upon rotation thereof, to discharge a flow of air having a velocity magnitude and a pressure magnitude from the trailing edge; and a radial diffuser for directing a flow of compressed air with a radial component to a diffused annular flow having an axial component, the radial diffuser comprising:

a housing including an air inlet and an air outlet, and defining a radial section extending at least substantially radially outward from the air inlet to a transition between the air inlet and air outlet, an axial section extending at least substantially axially from the transition to the air outlet, the transition including a bend and extending between the radial section and the axial section; and a plurality of diffuser vanes coupled to the housing and extending through the radial section, the plurality of diffuser vanes defining a plurality of diffusion flow passages through the radial section, a deswirl cascade having a plurality of deswirl vanes and coupled to the housing after the bend in the transition, wherein the plurality of deswirl vanes are arranged in a first row of deswirl vanes and a second row of deswirl vanes and a plurality of spaces devoid of deswirl vanes is formed in the first row of deswirl vanes, and a plurality of vane extensions are disposed after the radial section, extending through the bend with each one of the plurality of vane extensions extending into one of the plurality spaces, wherein at least a portion of the vane extensions include a service passage extending therethrough, each service passage being configured to allow a service conduit to extend therethrough.

11. The compressor system of claim 10, wherein each of the plurality of vane extensions is further configured to deswirl the diffused air.

12. The compressor system of claim 10, further comprising at least one service conduit extending through the service passage.

13. The compressor system of claim 10, wherein each of the plurality of vane extensions provides a structural tie with at least one external structure.

14. The gas turbine engine of claim 13, wherein the structural tie defines at least one load path from a mid-sump housing to the compressor housing.

* * * * *